Jan. 21, 1941.    H. P. PHILLIPS    2,229,124

PISTON GROOVE DEPTH GAUGE

Filed Nov. 4, 1939

INVENTOR.
Harold P. Phillips
BY Earl F. Chappell
ATTORNEYS

Patented Jan. 21, 1941

2,229,124

UNITED STATES PATENT OFFICE 2,229,124

PISTON GROOVE DEPTH GAUGE

Harold P. Phillips, Hastings, Mich., assignor to Hastings Manufacturing Company, Hastings, Mich.

Application November 4, 1939, Serial No. 302,859

3 Claims. (Cl. 33—169)

This invention relates to improvements in piston groove depth gauges.

The main objects of my invention are:

First, to provide a novel gauge for testing the annular ring grooves of a piston to ascertain if the same are of proper radial depth to permit the installation therein of rings having certain dimensions or to determine proper ring radial dimension.

Second, to provide a gauge which is extremely simple and inexpensive and enables the ready testing of ring grooves to ascertain if the depth of the same is within a predetermined tolerance.

Third, to provide testing means in the form of a set of gauge elements of similar type having corresponding shallow and deep gauge elements, all of the shallow elements of the set bearing a predetermined size relation to all of the deep gauge elements of the set and all corresponding elements of the set bearing a predetermined graduated size relation to one another whereby the testing of pistons for the installation of rings or ring assemblies of practically any desired type is made possible, or the need for compensating for excessive depth or shallowness in any given instance is determined.

Fourth, to provide gauges of the type described which are very inexpensive so that they may be distributed gratis with a set of piston rings or ring assemblies to thereby enable the installation of a proper ring or assembly by one who is relatively unskilled in the art.

Further objects relating to details and economies of my invention will definitely appear from the description to follow. The invention is defined in the claims.

A structure embodying the features of my invention is illustrated in the accompanying drawing, wherein.

The present invention relates to a gauge or set of gauges for determining the correct groove depth for the installation of any particular type of piston ring. It is of primary importance that in making a piston ring installation rings of the proper radial thickness and proper expansive action shall be selected so that optimum sealing and compression are attained. Occasionally cases are found where a piston will have a depth of groove too great or too small for a standard ring installation and it is desirable to be able to ascertain this fact quickly and conveniently so that certain compensating steps, either in the selection of the type or size of ring or in the alteration of the piston groove, can be effected. For instance, if the groove is too deep, it is possible to substitute a certain type of inner ring to compensate for this excessive depth and still give the requisite wall tension to the ring installed in the groove. On the other hand, in the case of an excessively shallow groove, it may be necessary either to supply a special ring or to deepen the groove by a lathe turning operation. The gauge device of my invention makes this operation of determining groove depth an exceedingly simple and quickly performed one.

Figure 6:
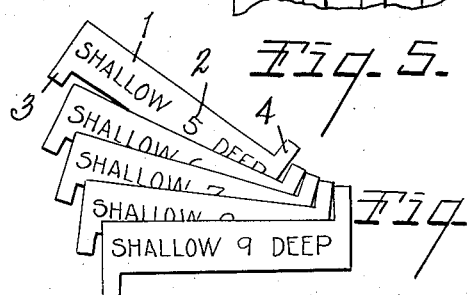
Fig. 6 is a view illustrating a set of coordinated or graduated gauge elements in accordance with my invention to enable the checking of a number of different groove depths so that the selection of a properly proportioned ring or ring assembly for any given piston is greatly facilitated.

In the drawing, the reference numeral 1 indicates one of the gauges of my invention which I contemplate supplying in sets such as that illustrated in Fig. 6 bearing individual identifying numbers or indicia 2, the individual gauges of each set having predetermined size relationships to one another so far as the gauging elements thereof are concerned, as will be more particularly pointed out.

Each of these gauges 1 is a thin, flat, generally rectangular sheet metal member and carries a pair of oppositely extending gauge elements 3, 4 at the opposite ends thereof, which elements project beyond the opposite sides 5 of the gauge distances depending upon the size or depth of groove which the gauge is designed to test. One of these elements, namely, the element 3, is adapted to be used to ascertain if the groove is sufficiently deep, or conversely, whether or not the groove is too shallow, and accordingly is designated as illustrated by the appellation "Shallow," or equivalent indication. The other element 4 is longer than the element 3 and is utilized to ascertain whether the groove is excessively deep and is accordingly designated by an appellation such as "Deep." Each of the sides 5 is of sufficient length to insure that it will overlap onto the ungrooved portion or skirt of the piston regardless of what groove is being gauged. This makes it possible to secure a substantial linear support for the side of the gauge in some cases where the lands between the piston grooves 6 may be damaged.

Figure 1:
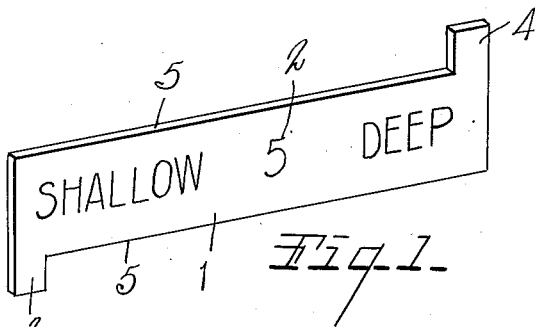
Fig. 1 is a perspective view illustrating a groove depth gauge in accordance with my invention.
Figure 2:
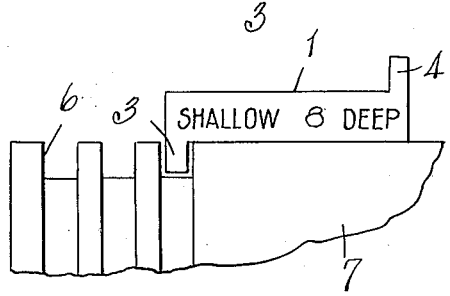
Figs. 2 and 3 are fragmentary views illustrating the manner of utilizing the gauge of Fig. 1 in the checking of the depth of a piston ring groove preceding selection and installation of a ring therefor.
Figure 3:
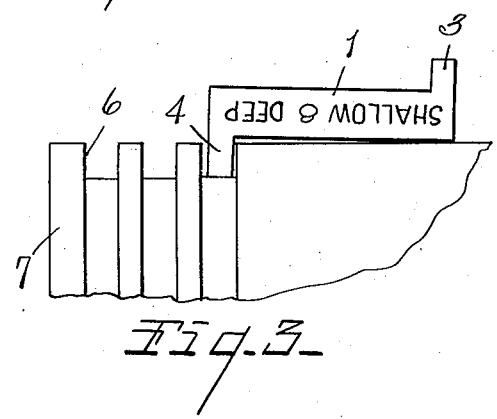

In gauging the grooves 6 of the conventional piston 7 illustrated in Figs. 2 to 5, inclusive, the gauge is laid with a side 5 thereof along or parallel to the piston skirt in the manner illustrated with one of the elements 3, for example, the "shallow" element, as illustrated in Fig. 2, projecting into the groove. If the extremity of this shallow element fails to touch the bottom of the groove, the latter is of at least sufficient depth, i. e., it is not too shallow and in this respect is of proper size for the ring or ring assembly corresponding to the gauge employed, which in the case illustrated in Figs. 2 and 3 is designated by the individuum "6." Having ascertained that the groove is of at least adequate depth, the user next reverses the gauge 1 and inserts the opposite or "deep" gauge element 4 into the groove. If the extremity of this element engages the bottom of the groove to even the slightest extent so that no light can be seen between the bottom of the groove and the element extremity or so that light can be seen between the piston skirt and the side 5 of the gauge, then the groove is not only of adequate depth, but it is likewise not too deep, and a ring or ring assembly installation corresponding to the gauge "6" is proper.

Figure 4:
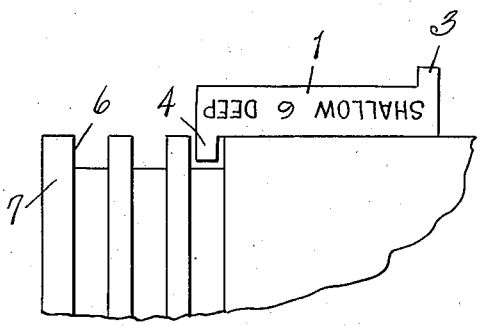
Figs. 4 and 5 are views similar to Figs. 2 and 3, further clarifying the manner in which the device of my invention is used.
Figure 5:
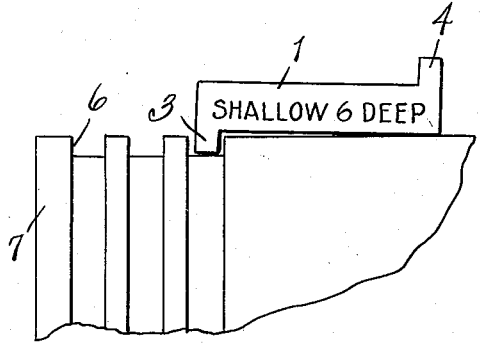

If, on the other hand, when the "deep" element is inserted in the groove as illustrated in Fig. 4 and light is seen between the end of the element and the bottom of the groove, the latter is of excessive depth and compensating means must be adopted, such as the use of a different installation than that corresponding to the gauge "8" or else a larger inner expanding ring or spring should be utilized. If, as illustrated in Fig. 5, the "shallow" element 3, when inserted in the ring groove engages the bottom thereof so that light is seen between the piston skirt and the side 5 of the gauge, then it follows that this groove is too shallow for the installation corresponding to gauge "8" and compensation should be made, as for example utilizing a special ring installation or machining the ring groove.

In all of the gauges of the set such as is illustrated in Fig. 6, the difference in length between the gauge elements 3 and 4 is uniform, being preferably from .021 to .025 inch, this being the allowable tolerance within which proper wall tension is exerted by a ring installation corresponding to a given gauge. A tolerance between these approximate limits, for example, .023 inch, is even more desirable.

As stated above, the gauges of a set such as is illustrated in Fig. 6 are also related as regards their elements 3, 4 in a definite graduated size relationship so that a single set enables the engaging of a large range of groove dimensions. Thus, in the illustrated embodiment of my invention, there is a difference of .010 inch in the length of each projecting element 3 or 4 with reference to the corresponding element of the next succeeding or preceding gauge. For example, in a #8 gauge, the "shallow" and "deep" elements 3, 4 are each .010 inch longer than the respective corresponding elements of a #7 gauge. The same relation holds true in connection with all of the other gauges of the set.

It will be obvious to those skilled in the art that a set of the gauges such as is illustrated in Fig. 6 might be assembled together as a unit, being, for example, pivoted together at a medial point for use by garages, service stations, mechanics, and the like to enable them to check any piston whatever to determine the proper size of replacement rings to be installed on a job.

I am aware that it is old in certain fields to employ "Go" and "No go" gauges, however in the particular application of the present invention, i. e., to the gauging of piston grooves, the use of a plurality of gauges correlated in a definite graduated relation to one another and the elements of each individual gauge each bearing a predetermined constant size relation to one another is novel with me. Furthermore, I consider it novel to provide a gauge of the particular nature described above bearing designations of particular pertinence only to the art of testing for piston ring installation under consideration.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A gauge for determining the proper installation of a piston ring or ring assembly in a piston ring groove or to ascertain the need for compensation prior to such installation, comprising a thin flat sheet metal gauge member having oppositely projecting gauge elements adjacent opposite ends thereof extending different distances from the opposite sides of the member, the difference in extent of the elements being approximately .023 inch, said gauge being adapted to be disposed with its side parallel to a piston skirt and one of said elements extending into a piston ring groove, said elements being identified as to shallowness or depth of the groove tested thereby so that excessive shallowness or depth of the groove may be readily ascertained, the sides of the member being sufficiently long to insure contact thereof with a portion of the piston skirt regardless of which groove the elements are inserted in.

2. A gauge for determining the proper installation of a piston ring or ring assembly in a piston ring groove or to ascertain the need for compensation prior to such installation, comprising a gauge member having parallel opposed edges and having oppositely projecting gauge elements on said edges extending different distances from the opposite edges of the member, the difference in extent of the elements being approximately .023 inch, said gauge being adapted to be disposed with its edge parallel to a piston skirt and one of said elements extending into a piston ring groove, said elements being identified as to shallowness or depth of the groove tested thereby so that excessive shallowness or depth of the groove may be readily ascertained, the edges of the member being sufficiently long to insure contact thereof with a portion of the piston skirt regardless of which groove the elements are inserted in.

3. A gauge for determining the proper piston ring installation for the groove of a piston, comprising a thin flat member having opposed straight edges and parallel gauging elements projecting from said respective edges in opposite directions, the sides of both said elements being extensions of the sides of said member, said gauging elements projecting different distances from said edges and being of uniform thickness equal to that of the gauge member, said member being adapted to be disposed with an edge parallel to and in contact with a piston skirt and with one of said elements extending into a ring groove of the piston, whereby excessive depth or shallowness of the groove may be readily ascertained in accordance with the engagement or non-engagement of said elements with the bottom of the groove when the member is so positioned.

HAROLD P. PHILLIPS.